United States Patent
Davis et al.

(10) Patent No.: US 7,601,783 B2
(45) Date of Patent: Oct. 13, 2009

(54) METHOD OF CONTROLLING OLEFIN POLYMERIZATION

(75) Inventors: Mark B. Davis, Hurricane, WV (US); James Daniel Madden, Pocatello, ID (US)

(73) Assignee: Dow Global Technologies, Inc., Midland, MI (US)

( * ) Notice: Subject to any disclaimer, the term of this patent is extended or adjusted under 35 U.S.C. 154(b) by 428 days.

(21) Appl. No.: 11/099,328

(22) Filed: Apr. 5, 2005

(65) Prior Publication Data

US 2005/0228138 A1  Oct. 13, 2005

Related U.S. Application Data

(60) Provisional application No. 60/560,230, filed on Apr. 7, 2004.

(51) Int. Cl.
*C08L 23/00* (2006.01)
*C08L 23/04* (2006.01)

(52) U.S. Cl. ............................... 525/191; 525/240

(58) Field of Classification Search .............. 525/191, 525/240
See application file for complete search history.

(56) References Cited

U.S. PATENT DOCUMENTS

| | | | |
|---|---|---|---|
| 3,190,862 A | 6/1965 | Boghetich et al. | |
| 3,373,148 A | 3/1968 | Edwin et al. | |
| 3,645,992 A | 2/1972 | Elston | |
| 4,076,698 A | 2/1978 | Anderson et al. | |
| 4,218,399 A | 8/1980 | Siclari et al. | |
| 4,328,122 A | 5/1982 | Monte et al. | |
| 4,395,360 A | 7/1983 | Albizatti et al. | |
| 4,473,660 A | 9/1984 | Albizzati et al. | |
| 4,481,301 A | 11/1984 | Nowlin et al. | |
| 4,562,173 A | 12/1985 | Terano et al. | |
| 4,918,038 A | 4/1990 | Samuels et al. | |
| 4,937,299 A | 6/1990 | Ewen et al. | |
| 4,939,217 A | 7/1990 | Stricklen | |
| 5,026,798 A | 6/1991 | Canich | |
| 5,055,438 A | 10/1991 | Canich | |
| 5,064,802 A | 11/1991 | Stevens et al. | |
| 5,237,025 A | 8/1993 | Benham et al. | |
| 5,330,950 A | 7/1994 | Hsieh et al. | |
| 5,442,018 A | 8/1995 | Cann et al. | |
| 5,442,020 A | 8/1995 | Davis | |
| 5,525,678 A | 6/1996 | Mink et al. | |
| 5,539,076 A | 7/1996 | Nowlin et al. | |
| 5,614,456 A | 3/1997 | Mink et al. | |
| 5,624,877 A | 4/1997 | Bergmeister et al. | |
| 5,648,439 A | 7/1997 | Bergmeister et al. | |
| 5,882,750 A | 3/1999 | Mink et al. | |
| 6,001,766 A | 12/1999 | Kissin et al. | |
| 6,051,525 A | 4/2000 | Lo et al. | |
| 6,184,299 B1 * | 2/2001 | Madden et al. | 525/242 |
| 6,258,903 B1 | 7/2001 | Mawson et al. | |
| 6,372,868 B1 | 4/2002 | Szul et al. | |
| 6,461,696 B1 * | 10/2002 | Ling et al. | 428/34.5 |
| 6,828,395 B1 | 12/2004 | Ehrman et al. | |
| 7,101,939 B2 * | 9/2006 | Nowlin et al. | 526/114 |
| 7,238,756 B2 * | 7/2007 | Ehrman et al. | 526/114 |

FOREIGN PATENT DOCUMENTS

| | | |
|---|---|---|
| EP | 0 416 815 A2 | 3/1991 |
| GB | 1 170 299 | 11/1969 |
| WO | WO 03/048213 | 6/2003 |

OTHER PUBLICATIONS

Exxon Chemical, "A new family of linear ethylene polymers provides enhanced sealing performance," Tappi Journal, Feb. 1992, 75(2), abstract.
International Search Report dated Jul. 13, 2005 for PCT/US2005/011493.

* cited by examiner

*Primary Examiner*—Nathan M Nutter (57) ABSTRACT

A method of making polyolefin with a target melt flow index and melt flow rate is disclosed. The method polymerizes one or more olefinic monomers in a single reactor containing a bicomponent catalyst system. The catalyst system includes a first catalyst component and a second catalyst component each characterized by a catalyst productivity and a chain-transfer-agent response. The single reactor has a chain-transfer-agent concentration and a temperature. The productivity of the second catalyst component is substantially different temperature dependent than that of the first catalyst component. The chain-transfer-agent response of the second catalyst component is substantially different sensitive than that of the first catalyst component. The temperature of the reactor is adjusted so that the melt flow ratio approaches the target value. The chain transfer agent concentration in the reactor is adjusted so that the melt index approaches the target value.

28 Claims, 1 Drawing Sheet

METHOD OF CONTROLLING OLEFIN POLYMERIZATION

PRIOR RELATED APPLICATIONS

This application claims priority to prior filed U.S. Provisional Application Ser. No. 60/560,230 filed on Apr. 7, 2004, which is incorporated herein in its entirety.

FEDERALLY SPONSORED RESEARCH STATEMENT

Not applicable.

REFERENCE TO MICROFICHE APPENDIX

Not applicable.

FIELD OF THE INVENTION

The invention relates to a polymerization process and more particularly to a method to control the flow index and melt flow ratio of the resulting polymer.

BACKGROUND OF THE INVENTION

The term "bimodal" as applied to polyolefin resins usually means that the resin has two distinct ranges of molecular weight or density, which can impart desired properties to the product in great variety. Originally, bimodal resins were made in two separate reactors or reaction chambers—that is, a product having a first molecular weight was moved directly from the reaction zone in which it was made and introduced to a reaction zone having conditions for making a resin of a different molecular weight, where more resin was made. The two resins are thus mixed or, in some cases, even present in the same particles. Two-stage processes are difficult to control and, perhaps more important, have a capital disadvantage in that two reactors, or at least two reaction zones, are required to make them. Moreover, frequently the products are not homogeneously mixed in that at least some particles are entirely of one mode or the other. It is therefore desirable to find ways of making homogeneous bimodal polyolefins in a single reactor.

One approach to making bimodal polyolefins in a single reactor has been to employ a mixed catalyst system, in which one catalyst component makes a primarily low molecular weight (LMW) product and the other catalyst component produces a primarily high molecular weight (HMW) product because of different termination and/or chain transfer kinetics. By including both of these catalyst components in the same catalyst composition, a bimodal product can be produced. The molecular weight modes of the product are intimately mixed, providing a resin product that is relatively free of gels compared to similar products made in staged-reactor processes or by the blending of two distinct unimodal resins.

Controlling the ratio of the components in the bimodal product is a significant manufacturing concern. Product properties of bimodal resins are often sensitive to component split. For instance, in the manufacture of high-density, high-molecular-weight film, to achieve the desired specification requires control of component split within about 2% of the setpoint.

The weight percentage, or "split," of HMW or high density ("HD") in the total product including LMW or low density ("LD") components in a single-reactor manufactured bimodal resin is primarily a function of the relative amount of each type of catalyst in the catalyst system. While theoretically, a catalyst system containing proper amounts of each catalyst could be generated and used to produce the desired split in a particular case, in practice using such a system would be difficult, as the relative productivities of the catalyst components can change with variations in reactor conditions or poison levels.

A technique for changing the flow properties of a bimodal resin is by changing the resin component split, or weight fraction of the HMW component in the product. By modifying the relative amounts of HMW and LMW components in the resin, flow properties can be changed as well. Unfortunately, in some cases changing the split affects more than one variable. In some products, changing the HMW split by a few percent can significantly affect both resin flow index and melt flow ratio (MFR).

One method of changing the component split of a bimodal resin is to add a selective poison ($CO_2$ or $H_2O$) to the reactor. With this method, the flow index is changed by altering the polymer split. Unfortunately, the melt flow ratio (MFR) of the polymer changes with significant flow index variations.

Another example of changing the component split uses a trim catalyst. The primary catalyst is a bimetallic material that makes a bimodal product. To control the split of the polymer, a small amount of low molecular weight producing catalyst is fed independently of the primary catalyst feed; this "trim catalyst" is adjusted to achieve the proper product split. This method controls only the split of the polymer. Flow index and melt flow ratio (MFR) change based on the split change, but independent control of the two is not possible with only the trim catalyst. Moreover, the reactor response times to catalyst changes are relatively long relative to those of reactor gas changes. Changing catalyst composition, because of its low feed rate, is a slower process; replacing the existing catalyst inventory in a reactor with a new blend takes a significant amount of time. Also, feeding a catalyst stream of a pure component to a reaction using bimetallic catalyst likely creates a less homogeneous product mixture. Bimodal resin particles are combined with a small amount of unimodal (usually low molecular weight) resin particles that were made from the trimming catalyst. Unfortunately, low molecular weight particles do not blend well with the lower melt-index bimodal resin particles. This lack of adequate mixing may affect product properties. For instance, while making film from the bimodal resin, inadequately mixed resin particles may result in the formation of gels.

Because it is often desired to control both flow index and melt flow ratio (MFR) in a multi-site polymer process, a technique is needed to enable the independent control of each of these properties.

DESCRIPTION OF EMBODIMENTS OF THE INVENTION

In the following description, all numbers disclosed herein are approximate values, regardless whether the word "about" or "approximate" is used in connection therewith. They can vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

The term "polymer" as used herein refers to a macromolecular compound prepared by polymerizing monomers of the same or a different type. A polymer refers to homopolymers, copolymers, terpolymers, interpolymers, and so on. The term "interpolymer" used herein refers to polymers prepared by the polymerization of at least two types of monomers or comonomers. It includes, but is not limited to, copolymers (which usually refers to polymers prepared from two different monomers or comonomers), terpolymers (which usually refers to polymers prepared from three different types of monomers or comonomers), and tetrapolymers (which usually refers to polymers prepared from four different types of monomers or comonomers), and the like. The term "monomer" or "comonomer" refers to any compound with a polymerizable moiety which is added to a reactor in order to produce a polymer. "Metallocene catalyzed polymer" used herein refers to any polymer that is made in the presence of one metallocene catalyst or one constrained geometry catalyst. The term "metallocene" as used herein refers to a metal-containing compound having at least one substituted or unsubstituted cyclopentadienyl group bound to the metal.

Polymerization conditions generally refer to temperature, pressure, monomer content (including comonomer concentration), catalyst concentration, cocatalyst concentration, activator concentration, etc., that influence the molecular weight of the polymer produced. The weight-average molecular weight ($M_w$) of a homopolymer, copolymer, or other interpolymer can be measured by gel permeation chromatography as described in U.S. Pat. No. 5,272,236, which is incorporated by reference herein in its entirety. For ethylene polymers or interpolymers, one method to determine the molecular weight is to measure the melt index according to ASTM D-1238 Condition 190° C./2.16 kg (formerly known as "Condition E" and also known as "$I_2$"). Generally, melt index ($I_2$) is inversely related to the molecular weight of an ethylene polymer. The higher the molecular weight, the lower the melt index ($I_2$), although the relationship is not necessarily linear. Another measurement used in characterizing the molecular weight of ethylene polymers involves measuring the melt index with a higher weight in accordance with ASTM D-1238, Condition 190° C./21.6 kg (formerly known as "Condition F" and also known as "$I_{21}$"). Melt Flow Ratio (MFR) is defined herein as the ratio of the flow index (FI or $I_{21}$) divided by the melt index ($I_2$), i.e., $I_{21}/I_2$. Molecular weight distribution is the weight average molecular weight ($M_w$) divided by number average molecular weight ($M_n$), i.e., $M_w/M_n$.

Embodiments of the invention provide a method of making polyolefin with a target melt flow index and melt flow rate. The method polymerizes one or more olefinic monomers in a single reactor containing a bicomponent catalyst system. The catalyst system includes a first catalyst component and a second catalyst component, each of which is characterized by a catalyst productivity and a chain-transfer-agent response. The productivity of the second catalyst component has a substantially different temperature dependence than that of the first catalyst component. The chain-transfer-agent response of the second catalyst component has a substantially different sensitivity than that of the first catalyst component. The polymerization of the olefinic monomers produces an olefin polymer characterized by a melt index $I_2$ and a melt flow ratio, $I_{10}/I_2$. The temperature of the reactor is adjusted so that the melt flow ratio approaches the target value. The chain transfer agent concentration in the reactor is adjusted so that the melt index approaches the target value without changing the melt flow ratio substantially.

In some embodiments, the first catalyst is a high molecular weight catalyst and the second catalyst is a low molecular weight catalyst. Alternatively, the first catalyst is a low molecular weight catalyst and the second catalyst is a high molecular weight catalyst.

A high molecular weight catalyst and a low molecular weight catalyst are determined with reference to each other. One does not know whether a catalyst is a high molecular weight catalyst or a low molecular weight catalyst until after another catalyst is also selected. Therefore, the terms "high molecular weight" and "low molecular weight" used herein when referring to a catalyst are merely relative terms and do not encompass any absolute value with respect to the molecular weight of a polymer. After a pair of catalysts are selected, one can easily ascertain which one is the high molecular weight catalyst by the following procedure: 1) select at least one monomer which can be polymerized by the chosen catalysts; 2) make a polymer from the selected monomer(s) in a single reactor containing one of the selected catalysts under pre-selected polymerization conditions; 3) make another polymer from the same monomer(s) in a single reactor containing the other catalyst under substantially the same polymerization conditions; and 4) measure the melt index $I_2$ for the respective interpolymers. The catalyst that yields a lower $I_2$ is the higher molecular weight catalyst. Conversely, the catalyst that yields a high $I_2$ is the lower molecular weight catalyst. Using this methodology, it is possible to rank a plurality of catalysts based on the molecular weight of the polymers they can produce under substantially the same conditions. As such, one can select three, four, five, six, or more catalysts according to their molecular weight capability and use these catalysts simultaneously in a single polymerization reactor to produce polymers with tailored structures and properties.

In some embodiments, the high molecular weight catalysts and the low molecular weight catalysts are selected such that they have substantially different productivity and chain transfer agent responses. In other words, under substantially the same conditions of substantially differently to a temperature change and/or the addition of a chain transfer agent into the system.

Due to the intrinsic molecular weight differences in the polymer produced by the chosen high and low molecular weight catalyst, the polymer produced by the two catalysts in a single reactor has a high molecular weight fraction and a low molecular weight fraction. Such a phenomenon is referred to herein after as "polymer split." A polymer split is defined as the weight fraction of the high molecular weight polymer component in a polymer with such split. The relative fraction of the high molecular weight component can be measured by deconvoluting a gel permeation chromatography ("GPC") peak. One characteristic of the process described herein is that the polymer split can be varied from 0 to 100% by adjusting the ratio of the high molecular weight catalyst to the low molecular weight catalyst. Because any two catalysts can exhibit different catalytic efficiency at a given set of polymerization process conditions, the polymer split may not correspond directly to the molar ratio of the two catalysts.

Due to the complex dependence of melt/flow properties on the position and shape of a polymer molecular weight distribution, the method to make a polymer with a target melt flow index and melt flow rate requires more than one variable. Based on the productivity of the catalyst and the reaction to a chain transfer agent, temperature and amount of chain transfer agent are used in a coordinated scheme to target the melt index and melt flow ratio of resin produced with the catalyst system. Any catalyst system in which the two catalyst components have substantially different productivity temperature dependency and chain transfer agent responses may be used. The catalyst system can be a Ziegler-Natta catalyst combined with a single site catalyst, two Ziegler-Natta catalysts, or two single site catalysts. In a preferred embodiment, the catalyst system is made up of two Ziegler-Natta catalysts. In a preferred embodiment, the Ziegler-Natta catalysts have titanium and hafnium active catalyst sites.

Generally, the components of a conventional supported Ziegler-Natta catalyst are an aluminum alkyl and a transition metal compound on an inert support with, optionally, an electron donor. Some of the traditional Ziegler-Natta catalysts include species wherein $TiCl_3$ is supported on a $TiCl_3$ catalyst. Any of the conventional heterogeneous Ziegler-Natta transition metal compound catalyst components for producing polyolefins can be used. The compound can be of the general formula $MR_X$ where M is the metal, R is a halogen or a hydrocarboxyl and X is the valance of the metal. Preferably, M is a Group IVB, VB, or VIB metal, more preferably a Group IVB, and most preferably titanium. Preferably R is chlorine, bromine, an alkoxy or a phenoxy, more preferably chlorine or ethoxy and most preferably chlorine. Illustrative examples of the transition metal compound catalyst components are $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds can be used. No restriction on the number of transition metal compounds is made as long as at least one transition metal compound is present. The transition metal compound is supported on an inert solid which is chemically unreactive with any of the components of the heterogeneous or homogeneous catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide and carboxylates of magnesium. The aluminum alkyl is of the general formula $AlR_3$ where R is an alkyl of from 1-8 carbon atoms and each R can be the same or different. Examples of aluminum alkyls are trimethyl aluminum (TMA), triethyl aluminum (TEAl) and triisobutyl aluminum (TiBAl). The preferred aluminum alkyl is TEAl. The electron donor is any one of the electron donors which are effective with conventional supported Ziegler-Natta catalysts. Typically, an electron donor is an organosilicon compound. Examples of electron donors are cyclohexyl-methyldimethoxysilane (CMDS), diphenyldimethoxysilane (DPMS) and isobutyltrimethoxysilane (IBMS). Other examples of electron donors are disclosed in U.S. Pat. Nos. 4,218,399, 4,395,360, 4,328,122, 4,473,660, 4,562,173, and 4,457,562.

In a preferred embodiment, the catalysts and methods for preparing them are as described by co-pending U.S. Patent Application No. 60/523,616 filed on Nov. 20, 2003, which is hereby incorporated by reference in its entirety. The catalyst compositions comprise magnesium dichloride having supported thereon a mixture of Group 4 metal halides, especially a mixture of titanium chlorides and hafnium chlorides, which are prepared by spray drying a solution comprising a magnesium compound, especially magnesium dichloride, and the mixture of Group 4 metal compounds, especially halide containing compounds in a primary diluent, especially a diluent comprising one or more $C_{2-6}$ alcohols, and subsequently halogenating, preferably chlorinating the resulting solid particles. Preferred transition metal halides are a mixture of titanium trichloride (which may be complexed with $AlCl_3$ if desired) and hafnium tetrachloride. Preferred halogenating agents are organoaluminum halides, especially alkylaluminum sesquichlorides, such as ethylaluminum sesquichlorides $(Al_2(C_2H_5)_3Cl_3)$. The relative quantities of magnesium compound, transition metal compounds, and halogenating agent employed, as well as the identity of the halogenating agent all affect the relative performance of the resulting catalyst composition.

The molar ratio of magnesium compound to transition metal compounds used preferably lies in the range from 0.5/1 to 10/1, and more preferably is from 1/1 to 3/1. The molar ratio of titanium compound to hafnium compound in the preferred catalyst precursor compositions preferably lies in the range from 100/1 to 1/20, and more preferably is from 10/1 to 1/10. Most highly preferred catalyst precursors comprise magnesium, titanium and hafnium metals wherein the molar ratio, Mg/Ti/Hf, is x/1/y, where x is a number from 2 to 10, and y is a number from greater than 0 to 10. Depending on the desired polymer properties, the range of x and y may be varied to produce different polymer properties for particular end uses.

Suitable primary diluents used in the spray drying process include organic compounds that are capable of dissolving the magnesium compound and transition metal compounds used in forming the catalyst composition. Especially suited are alcohols, ethers, (poly)alkyleneglycols, (poly)alkyleneglycol ethers, and mixtures thereof. Preferred primary diluents are $C_{2-10}$ aliphatic alcohols, $C_{2-10}$ dialkylethers, $C_{4-10}$ cyclic ethers, and mixtures thereof. A most preferred primary diluent is ethanol.

Catalysts of different types have different productivities. Productivity is measured by ashing a sample of a product resin, and determining the weight percentage of ash. The ash is essentially composed of the catalyst. The productivity is calculated as pounds of polymer produced per pound of total catalyst consumed. The amount of Ti, Mg and Cl in the ash are determined by elemental analyses. In some embodiments, the productivity of the catalyst ranges from about 6000 to about 15000 for slurry polymerizations. In other embodiments, catalysts have productivity values higher or lower than this range. For gas-phase polymerizations, some catalysts have a productivity ranging from about 2000 to about 10000. Again, other catalysts can have a productivity outside this range.

In some embodiments, the first catalyst component and second catalyst component are characterized by a productivity differential ratio, $\Delta_p$, of at least about 1. The productivity differential ratio $\Delta_p$ is defined as follows:

$$\Delta_p = \frac{\rho_2^{90°\,C.} - \rho_2^{70°\,C.}}{\rho_1^{90°\,C.} - \rho_1^{70°\,C.}}$$

wherein $\rho_2^{90°\,C.}$ is the catalyst productivity of the second catalyst component at 90° C., $\rho_2^{70°\,C.}$ is the catalyst productivity of the second catalyst component at 70° C., $\rho_1^{90°\,C.}$ is the catalyst productivity of the first catalyst component at 90° C., $\rho_1^{70°\,C.}$ is the catalyst productivity of the first catalyst component at 70° C. This definition assumes that all polymerization conditions remain the same, except temperature. The productivity of the first catalyst component remains substantially the same over a temperature range from 70° C. to 90° C. Alternatively, the productivity of the first catalyst component increases no more than 10% over a temperature range from 70° C. to 90° C., no more than 20%, at least 30%, or at least 50%. The productivity of the second catalyst component remains substantially the same over a temperature range from 70° C. to 90° C. Alternatively, the productivity of the second catalyst component increases no more than 10% over a temperature range from 70° C. to 90° C., no more than 20%, at least 30%, or at least 50%. The productivity of the second catalyst component has a substantially different temperature dependence than that of the first catalyst component. The term "substantially different" is defined as having a $\Delta_p$ of at least about 1. In a preferred embodiment $\Delta_p$ is at least about 5, at least about 10, at least about 50, or at least about 100.

In other embodiments, the difference in hydrogen response of the two catalyst components is characterized by a hydrogen response differential ratio, $\Delta_H$, of at least about 1. The $\Delta_H$ is defined as follows:

$$\Delta_H = \frac{MW_2^{[H]1} - MW_2^{[H]2}}{MW_1^{[H]1} - MW_1^{[H]2}}$$

wherein $MW_2^{[H]1}$ is the molecular weight of the polymer produced by the second catalyst component at a hydrogen concentration of $[H]_1$, $MW_2^{[H]2}$ is the molecular weight of the polymer produced by the second catalyst component at a hydrogen concentration of $[H]_2$, $MW_1^{[H]1}$ is the molecular weight of the polymer produced by the first catalyst component at a hydrogen concentration of $[H]_1$, $MW_1^{[H]2}$ is the molecular weight of the polymer produced by the first catalyst component at a hydrogen concentration of $[H]_2$, and $[H]_2$ is three times of $[H]_1$. This definitions assumes that all polymerization conditions remain the same, except for the hydrogen concentration. It also applies to chain transfer agents other than hydrogen. In a preferred embodiment, the chain transfer agent is hydrogen. The hydrogen concentration is expressed as a relative concentration characterized as hydrogen to ethylene molar ratio, and $[H]_1$ is characterized as a hydrogen to ethylene molar ratio of 0.3. The chain-transfer-agent response of the second catalyst component has a substantially different sensitivity than that of the first catalyst component. The term "substantially different" is defined as having a $\Delta_H$ of at least about 1. In some embodiments, $\Delta_H$ is at least about 5, at least about 10, at least about 50, or at least about 100.

The wide variety of suitable catalysts that can be used in embodiments of the invention are listed in the following review of catalyst compositions useful in olefin polymerization.

Bimetallic catalysts are described by Kissin et al in U.S. Pat. No. 6,001,766. At least one of the two transition metal compounds used is a cyclopentadienyl compound, and the resulting catalyst composition is said to produce polymer of broad molecular weight distribution. The ratio of the cyclopentadienyl compound (which preferably includes zirconium) to the other transition metal can vary.

Various other patents owned by Mobil Oil Corporation, such as Mink et al U.S. Pat. No. 5,614,456, Nowlin et al U.S. Pat. No. 5,539,076, Mink et al U.S. Pat. No. 5,525,678, and Mink et al U.S. Pat. No. 5,882,750 describe catalysts said to be useful to make resins having bimodal characteristics. Mink et al in '678 discuss the relative productivities of two metal catalyst sites. Blends of low and high molecular weight resin are said to be made by a titanium-zirconium bimetallic catalyst; various densities and molecular weight distributions are achievable using different conditions and combinations of the catalysts. The Mink et al '750 patent purports to control the high molecular weight fraction of a bimodal product over a wide range, using a metallocene transition metal component and a non-metallocene transition metal component.

Ewen et al, in U.S. Pat. No. 4,937,299, utilizes both components in the form of metallocenes having different reactivities; they produce a homopolymer and a copolymer simultaneously. In U.S. Pat. No. 5,242,876, Shamshoum uses a combination of a metallocene and a conventional Ziegler-Natta catalyst to obtain a blend of polymers with different desired properties. Samuels et al U.S. Pat. No. 4,918,038 use combinations of vanadium and/or vanadium oxide or zirconium species. Bergmeister et al in U.S. Pat. Nos. 5,648,439 and 5,624,877 describe a system of two chromium catalysts to make multimodal resin products. Benham et al in U.S. Pat. No. 5,237,025 utilize a chromium and a titanium catalyst to make bimodal (col. 8, line 66) products; however, the two catalytic sites are physically separated. See also Stricklin U.S. Pat. No. 4,939,217, utilizing two different metallocenes with different termination rate constants; they are not used in the same catalyst composition so as to eliminate the possibility of particles without bimodal distribution. A vanadium/zirconium system is used by Samuels et al in U.S. Pat. No. 4,918,038 to obtain a desired molecular weight distribution. Bimetallic metallocenes are used by Davis in U.S. Pat. No. 5,442,020.

A family of mixed metal catalysts is described by Cann et al in U.S. Pat. No. 5,442,018. Although they are described for use in tandem reactors for making bimodal resins, they can be used here as well; as described elsewhere herein, an embodiment would be to utilize two of the biselective catalysts, having different ratios of the same catalyst components. An example of a bimodal catalyst composition is described by Cann et al in U.S. Pat. No. 5,442,018 as a mixed metal catalyst comprising a titanium complex that is the reaction product of a titanium-containing compound in which the titanium is in the +3 or +4 oxidation state, a magnesium halide and a first electron donor, and a vanadium complex that is a vanadium-containing compound in which the vanadium is in the +2, +3, +4, or +5 oxidation state optionally reacted with a second electron donor, optionally used with the modifier(s) and the cocatalyst described therein (column 3, line 49-68).

Any of the polyselective catalyst compositions described in the above mentioned patents can be used. The patent numbers are hereby repeated, as their entire specifications are incorporated herein by reference: U.S. Pat. Nos. 6,001,766, 5,614,456, 5,539,076, 5,525,678, 5,882,750, 4,937,299, 5,242,876, 5,648,439, 5,624,877, 5,237,025, 4,918,038, 4,939,217, 5,442,018 and 5,442,020. All of these patents disclose the use of a multi-species catalyst systems, most of them referring to the catalysts as bimetallic, but also termed biselective or polyselective, in that the metals or species are chosen for particular selected properties or functions. The metals or species can be chosen for producing different molecular weights under the same conditions, or producing resins of different densities, or for having different productivities, perhaps with respect to comonomers, for differing susceptibilities to hydrogen termination, or for other features or properties. While catalysts having three or more such differing functionalities (triselective or polyselective) can be used, it is preferred to have only two catalyst species in a given catalyst composition.

The use of polyselective catalysts is not limited to the catalysts described in the above enumerated patents, which does not represent an exhaustive list of such known olefin polymerization catalysts. As a method for targeting the composite product of a catalyst system is described, two or more polyselective catalysts are used. A biselective catalyst is one which has two different types of polymerization catalyst species in the same catalyst composition; a polyselective catalyst is one which has two or more different types of polymerization species in the same catalyst composition. Most often, this means that two species are present on the same support. Less frequently, the support itself acts as one of our active catalyst species, and supports a different catalyst species. In either case, since the two species are present in the same composition, and polymerizes the olefin(s) simultaneously, there is little or no chance that resin particles are made including only one mode of resin product. In a preferred embodiment, the weight ratio of the first catalyst component to the second catalyst component remains substantially the same during the polymerization process. No make-up catalyst of either the first catalyst component or the second catalyst component is introduced during the entire polymerization process.

For controlling bimodal molecular weights, a method employing two mixed (biselective) catalyst compositions may be used. For instance, if one biselective catalyst blend independently generates a product with a 70% HMW, 30% LMW split and the other generates a 50% HMW, 50% LMW product, the range of products possible for all relative catalyst feed rates would be from 50 to 70% HMW, compared to a range of 0 to 100% if separate HMW and LMW producing feeds are used. This restriction in the range of possible products significantly reduces the sensitivity of the overall system to perturbations in relative catalyst feed flow rates. In a preferred embodiment, the polymer comprises no more than 50 wt % of the HMW fraction. In an alternate embodiment, the polymer comprises no more than 30 wt % of the HMW fraction. In an alternate embodiment, the polymer comprises no more than 10 wt % of the HMW fraction.

The feed rates of catalyst compositions A and B can be manipulated in response to continuous or intermittent measurements, or a process model, of the desired product property or properties. The ratio of catalyst species X to catalyst species Y in a given biselective catalyst composition can be selected to provide a specific ratio of product having the property, or value thereof, of interest under a known set of polymerization conditions. The catalyst composition can then be referred to as one which provides a predetermined content, or "split," of, for example, high molecular weights compared to the overall product, which can differ from the weight or molar ratio of the metal components of the catalyst composition. In a preferred embodiment, the feed rates of catalyst compositions A and B remain substantially the same during polymerization. In other words, the weight ratio of the first catalyst to the second catalyst remains substantially the same during the polymerization process.

In principle, any two biselective or other polyselective catalyst compositions can be used, so long as they have an acceptable degree of effectiveness in imparting the property or properties desired. Typically they are bimetallic or polymetallic, but they can be biselective or polyselective for reasons other than the type of metal polymerization site. For example, the catalyst components can respond to different promoters or modifiers, and/or they can respond to chain terminators such as hydrogen in different ways or in different degrees. The mathematical advantages of the manipulation of two different pairs (or other plurality) of catalyst sites as explained with respect to the equations discussed hereafter are utilized.

Some bimetallic catalysts employed in the process contain at least two transition metals, one in the form of a metallocene and one transition metal in the form of a non-metallocene, and have an activity of at least about 1000 g polymer/g catalyst or about 50 kg polymer/g of each transition metal. The bimetallic catalysts are free of water.

Because of the different chain transfer agent response of each of the two sources of transition metals in the bimetallic catalyst, each produces a different molecular weight component under identical olefin polymerization conditions. In some embodiments, the metal of highest hydrogen response is present in amounts of about 0.1 to about 0.8 weight percent, in preferred embodiments that metal is hafnium. The metal of lowest hydrogen response is present in amounts of about 0.5 to about 3.0 weight percent; in preferred embodiments that metal is titanium. This catalyst system is catalytically effective to produce bimodal molecular weight distribution product containing about 0.05 to about 0.95 weight percent of the high molecular weight component. In a typical product of this catalyst, about 20% of the polyethylene is produced by the hafnium sites, and about 80% is produced by the titanium sites.

The catalysts of the current invention are capable of producing olefin polymers over a wide range of molecular weights, where the molecular weight distribution is characterized by a high molecular weight tail extending into the $10^6$ to $10^7$ molecular weight range. The high molecular weight component is uniformly blended at the molecular level with the lower molecular weight component. Such resins are difficult if not impossible to obtain by means of a post-reactor melt blending process. The additional high molecular weight polymer tail resulting from use of the catalyst compositions of the invention desirably increases the melt strength of the resin among other benefits. As previously mentioned, the ratio of the various metal components of the catalyst may be varied within the previously disclosed range to produce polyolefin products with specifically desired physically properties suited for particular end uses.

More particularly, catalyst having a metal molar ratio, $Mg_x/Ti/Hf_y$, where x is a number from 1 to 6, preferably from 3 to 5 and y is a number from 2 to 5, preferably from 2 to 4 are especially suited for preparation of high molecular weight polyolefins, especially ethylene/1-butene ethylene/1-hexene, and ethylene/1-octene resins. Such resins are highly desirable for use in sheet and film applications. The catalysts for use in this application also possess high catalyst productivity and good hydrogen chain transfer response.

In bimodal molecular weight distribution products, the weight fraction of the HMW component should be in the range of about 0.05 to about 0.95, more preferably from about 0.10 to about 0.90 for applications requiring broad molecular weight distribution resins. The flow index (FI) of the bimodal molecular weight product should be in the range of 2 to 100. If the bimodal molecular weight distribution product has an FI of less than 2, the FI is too low for processability. On the other hand, if overall polymer FI is too high, then product toughness properties decrease. Hence, it is necessary to control polymer FI in the polymerization reactor. Product melt flow ratio (MFR) values are preferably in the range of about 30 to about 250. Smaller melt flow ratio (MFR) values indicate relatively narrow molecular weight distribution polymers.

Chain transfer agents or telogens are used to control the melt flow index in a polymerization process. Chain transfer involves the termination of growing polymer chains, thus limiting the ultimate molecular weight of the polymer material. Chain transfer agents are typically hydrogen atom donors that react with a growing polymer chain and stop the polymerization reaction of said chain. These agents can be of many different types, from saturated hydrocarbons or unsaturated hydrocarbons to aldehydes, ketones or alcohols, including hydrogen and aluminum alkyls. By controlling the concentration of the selected chain transfer agent, one can control the length of polymer chains, and, hence, the weight average molecular weight, Mw. The melt index ($I_2$) of a polymer, which is related to Mw, is controlled in the same way.

After the donation of a hydrogen atom, the chain transfer agent can react with the monomers, or with already formed oligomers or polymers, to start a new polymer chain. This means that any functional groups present in chain transfer agents, for instance, carbonyl groups of aldehydes and ketones, are introduced in the polymer chains.

A large number of chain transfer agents, for example, propylene and 1-butene which have an olefinically unsaturated bond, can also be incorporated in the polymer chain themselves via a copolymerization reaction. This generally leads to the formation of short chain branching of respectively methyl and ethyl groups, which lowers the density of the polymers obtained. The chain transfer agent can be hydrogen, water, or carbon dioxide. In a preferred embodiment, the chain transfer agent is hydrogen.

Olefins are polymerized with catalysts as described above by any suitable process. Such processes include polymerizations carried out in suspension, in solution or in the gas phase. Gas phase polymerization reactions are preferred, e.g., those taking place in stirred bed reactors and, especially, fluidized bed reactors. The polymerization is carried out at relatively low temperatures, e.g., from about 30 to about 115° C. Preferably, polymerization pressures are less than about 10,000 psi, preferably less than about 1000 psi, and most preferably in the range of about 100 to about 400 psi.

A particularly desirable method for producing polyethylene polymers is in a fluid-bed reactor. Such a reactor and means for operating it are described by Nowlin et al, U.S. Pat. No. 4,481,301, the entire contents of which are incorporated herein by reference. The polymer produced in such a reactor contains the catalyst particles because the catalyst is not separated from the polymer. The molecular weight of the polymer can be controlled in a known manner, e.g., by using hydrogen. Reactor temperature, while affecting the average molecular weight of both the LMW and HMW components, is effective primarily by changing the split of the resin product. A different flow index and melt flow ratio is a consequence of this split change, with the flow index typically decreasing and the melt flow ratio (MFR) typically increasing with an increase in HMW component split. With a Ziegler Natta catalyst of hafnium and titanium, the apparent catalyst productivites of the titanium and hafnium catalyst components differ such that an increase in reactor temperature increases the productivity of the LMW Ti catalyst component much more than that of the hafnium catalyst component, thus decreasing the resin split in products made at higher temperatures. The temperature of the process ranges from about 30 to about 115° C., more preferably from about 75 to about 100° C.

When a fluid-bed reactor is employed, the chain transfer agent can be introduced separately. The chain transfer agent is added continuously to the reactor. In the presence of the catalyst described above, the chain transfer agent predominantly decreases the average molecular weight of the LMW component while having a less significant effect on the HMW component. The chain transfer agent also decreases the weight fraction of the HMW component to some degree, causing the relative weight fraction of LMW component to increase; the decrease in HMW component increases the FI of broad or bimodal molecular weight distribution resin. The amount of the chain transfer agent can range from 0.1 to 700,000 ppmv (based on reactor volume), preferably from 100,000 to 500,000 ppmv. When $H_2$ is employed as the chain transfer agent, the hydrogen/ethylene concentration ratio ranges from 0.000001 to 3; generally, 0.0001 to 2 has been employed in a gas-phase fluid-bed reactor. Although the chain transfer agent can be added separately, it can also be added as a mixture, a cofeed, with ethylene. The presence of the chain transfer agent acts to increase FI by at least about 10%. The increase in FI depends on the amount of chain transfer agent employed and the composition of the catalyst system. Increases in FI can range from 10 to 2000%, preferably 20 to 500% over that of a resin produced in the absence of the chain transfer agent.

The polymers are produced from monomers selected from ethylene, propylene, 1-butene, 1-hexene, 1-pentene, 4-methyl-1-pentene, 1-octene, 1-decene, vinyl-cyclohexene, styrene, ethylidene norbornene, norbornadiene, 1,3-butadiene, 1,5-hexadiene, 1,7-octadiene, 1,9-decadiene, or a combination thereof. The polymers may be homopolymers of ethylene or copolymers of ethylene with one or more $C_3$-$C_{20}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene copolymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene.

The term "linear" as used herein means that the ethylene polymer does not have long chain branching. That is, the polymer chains comprising the bulk linear ethylene polymer have an absence of long chain branching, as for example the traditional linear low density polyethylene polymers or linear high density polyethylene polymers made using Ziegler polymerization processes (e.g., U.S. Pat. No. 4,076,698 (Anderson et al.)), sometimes called heterogeneous polymers. The term "linear" does not refer to bulk high pressure branched polyethylene, ethylene/vinyl acetate copolymers, or ethylene/vinyl alcohol copolymers which are known to those skilled in the art to have numerous long chain branches. The term "linear" also refers to polymers made using uniform branching distribution polymerization processes, sometimes called homogeneous polymers, including narrow MWD (e.g. about 2) made using single site catalysts. Such uniformly branched or homogeneous polymers include those made as described in U.S. Pat. No. 3,645,992 (Elston) and those made using so-called single site catalysts in a batch reactor, having relatively high ethylene concentrations (as described in U.S. Pat. No. 5,026,798 (Canich) or in U.S. Pat. No. 5,055,438 (Canich)) or those made using constrained geometry catalysts in a batch reactor also having relatively high olefin concentrations (as described in U.S. Pat. No. 5,064,802 (Stevens et al.) or in EP 0 416 815 A2 (Stevens et al). The uniformly branched homogeneous polymers are those polymers in which the comonomer is randomly distributed within a given interpolymer molecule or chain, and wherein substantially all of the interpolymer molecules have the same ethylene/comonomer ratio within that interpolymer, but these polymers too have an absence of long chain branching, as for example, Exxon Chemical has taught in their February 1992 Tappi Journal paper.

Ideally, a model-based control scheme determines the approximate reaction conditions to achieve the desired melt flow ratio (MFR) and flow index. Using equations to determine the catalyst's productivity ratio, conditions are set to obtain the targeted melt flow index. Typically, the temperature is adjusted to fine-tune the melt flow ratio (MFR). Then, using equations to determine the response to a chain transfer agent, the chain transfer agent concentration is adjusted to achieve the targeted flow index. Typically, chain transfer agent concentration should be used as the final tuning variable, because its concentration has very little effect on melt flow ratio for small deviations. In contrast, small changes in reactor temperature changes both resin flow index and melt flow ratio (MFR). In a preferred embodiment, the temperature is adjusted before the chain transfer agent concentration. In an alternate embodiment, the chain transfer agent concentration can be adjusted before the temperature.

The flow index of the polymer ranges from about 2 to about 100, preferably from about 20 to about 40, and more preferably from about 5 to about 10. The melt flow ratio of the polymer ranges from about 30 to about 250, preferably from about 75 to about 180, and more preferably from about 100 to about 150.

The following examples exemplify some embodiments of the invention. They do not limit the invention as otherwise described and claimed herein. All numbers in the examples are approximate values.

EXAMPLES

The following method produced the catalysts used in the following examples. Specific details of the catalysts can be found in the example descriptions. Magnesium dichloride, titanium trichloride complexed with aluminum trichloride and hafnium tetrachloride were placed into a dry round bottom flask. The Mg:Ti:Hf molar ratio was 3:1:2. Anhydrous ethanol was added to the flask and the flask placed in an oil bath set at 100° C. The contents were refluxed for 3 hours producing a clear, blue colored reaction mixture. The solution was cooled to room temperature. Fumed silica, having a silane surface treatment, was placed in a dry bottle that was sealed with a septum. The bottle was purged with nitrogen for approximately 30 minutes and the cooled reaction mixture was transferred to the bottle. The bottle was placed on a roller until the solution and the silica were thoroughly mixed. The resulting mixture was spray-dried under nitrogen atmosphere, the dry powder recovered and stored under inert conditions.

Within a dry-box, the mixture was placed in a dry flask having a stir bar. The sealed flask was removed from the dry-box and fitted with a nitrogen line, condenser and addition funnel. Hexane was added to the flask to form a slurry. While cooling the flask in an ice bath, equivalents of a 25 percent hexane solution of ethylaluminum sesquichloride (EASC) were added dropwise to the flask through the addition funnel forming a dark brown composition having an Al/Hf molar ratio of 5. The flask was placed in an oil bath set at 100° C. and the contents refluxed for two hours. Stirring was discontinued, the flask was removed from the oil bath and allowed to come to room temperature. The solid product settled to the bottom of the flask and the supernatant removed by decantation. The solid product was washed three times with hexane and dried under reduced pressure.

Example 1

A catalyst comprising titanium and hafnium, as prepared above, was used to polymerize ethylene in a gas-phase fluidized bed reactor. The catalyst had a Ti loading of 2.87 wt %. The catalyst was activated with a tri-isobutyl aluminum cocatalyst. With an ethylene reactor partial pressure of about 135 psia, a reactor temperature of about 85° C., and a hydrogen partial pressure of about 94 psia, a product was made with an $I_{21}$ of about 27 g/10 min and an MFR ($I_{21}/I_2$) of about 86. In a subsequent experiment with an ethylene partial pressure of about 135 psia, a reactor temperature of about 77.5° C., and a hydrogen partial pressure of about 149 psia, a product was made with an $I_{21}$ of about 14 g/10 min and an MFR of about 197. Another experiment, with an ethylene partial pressure of about 135 psia, a reactor temperature of about 79° C., and a hydrogen partial pressure of about 159 psia, gave a product with an $I_{21}$ of about 24 g/10 min and MFR of about 170. These results are summarized in Table 1.

TABLE 1

Various experiments changing MFR with reactor temperature.

| Experiment | T (° C.) | $C_2H_4$ psia | $H_2$ psia | $I_{21}$ (g/10 min) | MFR ($I_{21}/I_2$) |
|---|---|---|---|---|---|
| 1 | 85 | 135 | 94 | 27 | 86 |
| 2 | 77.5 | 135 | 149 | 14 | 197 |
| 3 | 79 | 135 | 159 | 24 | 170 |

Experiments 1 and 3 demonstrate the coordinated control scheme, where temperature and hydrogen concentration are used to vary MFR while keeping a very similar flow index.

Example 2

A catalyst comprising titanium and hafnium, as prepared above, was used to polymerize ethylene in a gas-phase fluidized bed reactor. The catalyst had a Ti loading of 2.49 wt %. The catalyst was activated with a tri-isobutyl aluminum cocatalyst. With an ethylene partial pressure of about 150 psia, a reactor temperature of about 83° C., and a hydrogen partial pressure of about 92 psia, a product was made with an $I_{21}$ of about 14 g/10 min and a melt flow ratio (MFR) of about 145. In a second experiment, ethylene partial pressure remained at about 150 psia, reactor temperature remained at about 83° C., and a hydrogen partial pressure of about 82 psia was achieved. The product made in this process had an $I_{21}$ of about 10.4 g/10 min and an melt flow ratio (MFR) of about 150. These data are summarized in Table 2.

TABLE 2

Experiments changing hydrogen concentration

| Experiment | $H_2$ psia | $I_{21}$(g/10 min) | MFR ($I_{21}/I_2$) |
|---|---|---|---|
| 4 | 92 | 14 | 145 |
| 5 | 82 | 10 | 150 |

Example 3

Figure 1:
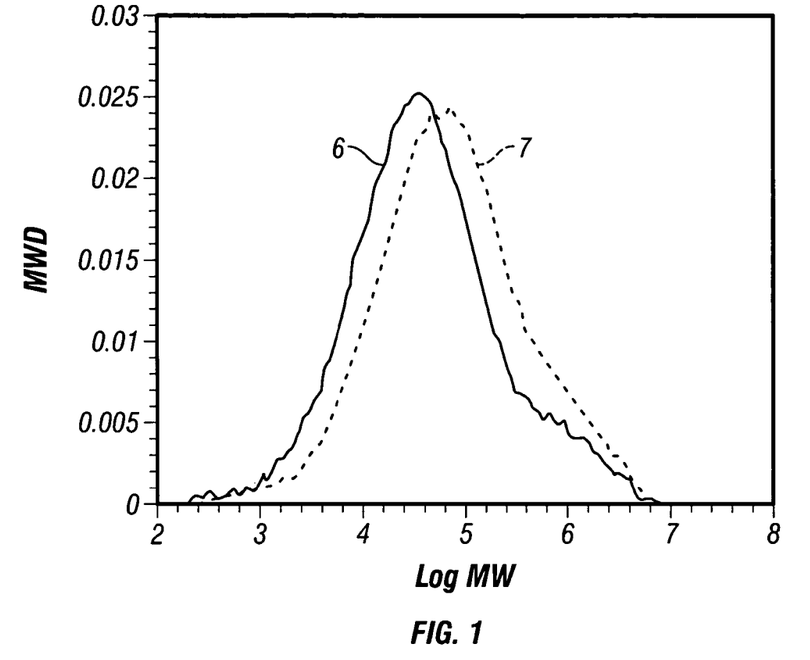
FIG. 1 is a gel permeation chromatography overlay plot of the polymers obtained in Experiments 6 and 7 of Example 3

A catalyst comprising titanium and hafnium, as prepared above, was used to polymerize ethylene in a gas-phase fluidized bed reactor. The catalyst had a Ti loading of 3.0 wt %. The catalyst was activated with a tri-isobutyl aluminum cocatalyst. With a hydrogen/ethylene ratio of 0.9, a reactor temperature of about 85° C., a product was made with an $I_{21}$ of about 58.5 g/10 min and a melt flow ratio (MFR) ($I_{21}/I_2$) of about 69.6. In a subsequent experiment with a hydrogen/ethylene ratio of 0.3, a reactor temperature of about 85° C., a product was made with an $I_{21}$ of about 6.96 g/10 min and a melt flow ratio (MFR) of about 82.9. These results are summarized in Table 3. FIG. 1 is an overlay of GPC plots of the polymers obtained in Examples 6 and 7. The shift of the plot to the right indicates a change in the molecular weight.

TABLE 3

Effect of hydrogen/ethylene ratio

| Experiment | H2/C2 | T (° C.) | HMW mw | LWM mw | HMW split % | $I_{21}$ (g/10 min) | MFR ($I_{21}/I_2$) |
|---|---|---|---|---|---|---|---|
| 6 | 0.9 | 85 | 739072 | 63799 | 19.7 | 58.5 | 69.6 |
| 7 | 0.3 | 85 | 824200 | 122582 | 24.3 | 6.96 | 82.9 |

Example 4

Figure 2:
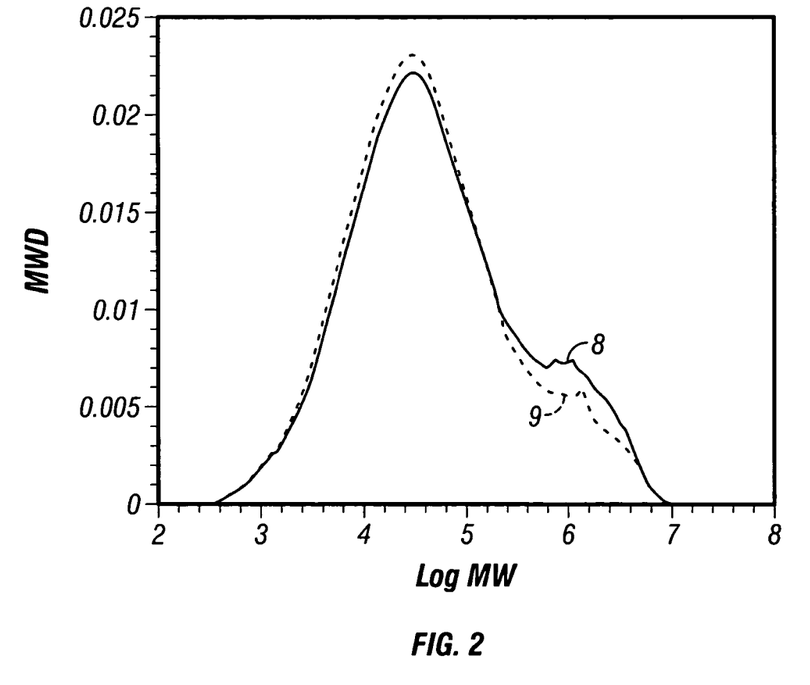
FIG. 2 is a gel permeation chromatography overlay plot of the polymers obtained in Experiments 8 and 9 of Example 4

A catalyst comprising titanium and hafnium, as prepared above, was used to polymerize ethylene in a gas-phase fluidized bed reactor. The catalyst had a Ti loading of 3.11 wt %. The catalyst was activated with a tri-isobutyl aluminum cocatalyst. With a hydrogen/ethylene ratio of 1.15, a reactor temperature of about 80.5° C., a product was made with an $I_{21}$ of about 22.4 g/10 min and a melt flow ratio (MFR) ($I_{21}/I_2$) of about 185. In a subsequent experiment with a hydrogen/ethylene ratio of 1.15, a reactor temperature of about 82.5° C., a product was made with an $I_{21}$ of about 36.1 g/10 min and an a melt flow ratio (MFR) of about 130. These results are summarized in Table 4. FIG. 2 is an overlay of the GPC plots of the polymers obtained in Examples 8 and 9. FIG. 2 shows that the molecular weight of the polymers did not change, but the ratio of the HMW to LMW (i.e., split) changed as the reactor temperature changed.

TABLE 4

Effect of temperature

| Experiment | H2/C2 | T (° C.) | HMW mw | LWM mw | HMW split % | $I_{21}$ (g/10 min) | MFR ($I_{21}/I_2$) |
|---|---|---|---|---|---|---|---|
| 8 | 1.15 | 80.5 | 972382 | 61085 | 30.6 | 22.4 | 185 |
| 9 | 1.15 | 82.5 | 991576 | 64332 | 22.8 | 36.1 | 130 |

These experiments provide an example of using hydrogen/ethylene molar ratio to fine tune resin flow index once the melt flow ratio (MFR) has been set by reactor temperature. Small hydrogen concentration variations do not significantly change resin melt flow ratio (MFR).

As demonstrated above, embodiments of the invention provide a method of making a polymer with a target melt flow index and melt flow ratio. The method offers the flexibility to control both properties using certain polymerization conditions, namely temperature and hydrogen partial pressure, in a coordinated manner. By adjusting these conditions, almost instantly effects are observed in the melt flow index and melt flow rate. This rapid control is advantageous in that substantial off-specification polymer can be avoided. Other advantages and properties are apparent to those skilled in the art.

While the invention has been described with a limited number of embodiments, these specific embodiments are not intended to limit the scope of the invention as otherwise described and claimed herein. Modification and variations from the described embodiments exist. It is understood that parameters of polymerization processes may vary, for example, in temperature, pressure, monomer concentration, polymer concentration, hydrogen partial pressure and so on. While some embodiments are described with reference to a single catalyst, it by no means precludes the use of two, three, four, five, or more catalysts simultaneously in a single reactor with similar or different capability for molecular weight and/or comonomer incorporation. In some embodiments, the catalysts may also include additives or other modifiers. In other embodiments, the catalysts do not include, or are substantially free of, any compounds not enumerated herein. Moreover, variations and modifications therefrom exist. It should be recognized that the process described herein may be used to make polymers which also incorporate one or more additional comonomers. While the processes are described as comprising one or more steps, it should be understood that these steps may be practiced in any order or sequence unless otherwise indicated. These steps may be combined or separated. Finally, any number disclosed herein should be construed to mean approximate, regardless of whether the word "about" or "approximate" is used in describing the number. Last but not least, the claimed catalysts are not limited to the processes described herein. They can be prepared by any suitable process. The appended claims intend to cover all such variations and modifications as falling within the scope of the invention.

What is claimed is:

1. A method of making polyolefin with a target flow index and melt flow ratio, comprising:
    contacting one or more olefinic monomers in a single reactor containing a bicomponent catalyst system comprising a first catalyst component and a second catalyst component, wherein the bicomponent catalyst system comprises two different Ziegler-Natta catalysts each characterized by a catalyst productivity and a chain-transfer-agent response; the single reactor being characterized by a chain-transfer-agent concentration and a temperature; the productivity of the second catalyst component having a substantially different temperature dependence than that of the first catalyst component; the chain-transfer-agent response of the second catalyst component having a substantially different sensitivity than that of the first catalyst component;

effectuating the polymerization of the olefinic monomers to produce an olefin polymer characterized by a flow index, $I_{21}$ and a melt flow ratio, $I_{21}/I_2$; and achieving in a coordinated manner the target flow index by controlling the chain transfer agent concentration and the melt flow ratio by controlling the reactor temperature.

2. The method of claim 1, wherein the chain transfer agent is hydrogen.

3. The method of claim 1, wherein the chain transfer agent is water or carbon dioxide.

4. The method of claim 1, wherein the first catalyst component produces a high molecular weight (HMW) fraction of the polymer, and the second catalyst component produces a low molecular weight (LMW) fraction of the polymer.

5. The method of claim 4, wherein the polymer comprises no more than 50 wt. % of the HMW fraction.

6. The method of claim 4, wherein the polymer comprises no more than 30 wt. % of the HMW fraction.

7. The method of claim 4, wherein the polymer comprises no more than 10 wt. % of the HMW fraction.

8. The method of claim 1, wherein the weight ratio of the first catalyst component to the second catalyst component remains substantially the same during the polymerization process.

9. The method of claim 1, wherein no make-up catalyst of either the first catalyst component or the second catalyst component is introduced during the entire polymerization process.

10. The method of claim 1, wherein the temperature adjustment is performed prior to hydrogen concentration adjustment.

11. The method of claim 1, wherein the productivity of the first catalyst component remains substantially the same over a temperature range from 70° C. to 90° C.

12. The method of claim 1, wherein the productivity of the first catalyst component increases no more than 10% over a temperature range from 70° C. to 90° C.

13. The method of claim 1, wherein the productivity of the first catalyst component increases no more than 20% over a temperature range from 70° C. to 90° C.

14. The method of claim 1, wherein the productivity of the second catalyst component increases at least 30% over a temperature range from 70° C. to 90° C.

15. The method of claim 1, wherein the productivity of the second catalyst component increases at least 50% over a temperature range from 70° C. to 90° C.

16. The method of claim 1, wherein the first catalyst component and second catalyst component are characterized by a productivity differential ratio, $\Delta_p$, of at least about 1; $\Delta_p$ is defined as follows:

$$\Delta_p = \frac{\rho_2^{90°\,C.} - \rho_2^{70°\,C.}}{\rho_1^{90°\,C.} - \rho_1^{70°\,C.}}$$

wherein $\rho_2^{90°\,C.}$ is the catalyst productivity of the second catalyst component at 90° C., $\rho_2^{70°\,C.}$ is the catalyst productivity of the second catalyst component at 70° C., $\rho_1^{90°\,C.}$ is the catalyst productivity of the first catalyst component at 90° C., $\rho_1^{70°\,C.}$ is the catalyst productivity of the first catalyst component at 70° C.

17. The method of claim 16, wherein $\Delta_p$ is at least about 5.

18. The method of claim 16, wherein $\Delta_p$ is at least about 10.

19. The method of claim 16, wherein $\Delta_p$ is at least about 50.

20. The method of claim 16, wherein $\Delta_p$ is at least about 100.

21. The method of claim 2, wherein the difference in hydrogen response of the two catalyst components is characterized by a hydrogen response differential ratio, $\Delta_H$, of at least about 1; the $\Delta_H$ is defined as follows:

$$\Delta_H = \frac{MW_2^{[H]1} - MW_2^{[H]2}}{MW_1^{[H]1} - MW_1^{[H]2}}$$

wherein $MW_2^{[H]1}$ is the molecular weight of the polymer produced by the second catalyst component at a hydrogen concentration of $[H]_1$, $MW_2^{[H]2}$ is the molecular weight of the polymer produced by the second catalyst component at a hydrogen concentration of $[H]_2$, $MW_1^{[H]1}$ is the molecular weight of the polymer produced by the second catalyst component at a hydrogen concentration of $[H]_1$, $MW_1^{[H]2}$ is the molecular weight of the polymer produced by the first catalyst component at a hydrogen concentration of $[H]_2$, and $[H]_2$ is three times of $[H]_1$.

22. The method of claim 21, wherein the hydrogen concentration is expressed as a relative concentration characterized as hydrogen to ethylene molar ratio, and $[H]_1$ is characterized as a hydrogen to ethylene molar ratio of 0.3.

23. The method of claim 21, wherein $\Delta_H$ is at least about 5.

24. The method of claim 21, wherein $\Delta_H$ is at least about 10.

25. The method of claim 21, wherein $\Delta_H$ is at least about 50.

26. The method of claim 21, wherein $\Delta_H$ is at least about 100.

27. The method of claim 1, wherein the first Ziegler-Natta catalyst comprises Ti and the second Ziegler Natta catalyst comprises Hf.

28. The method of claim 1, wherein the olefinic monomers are selected from ethylene, propylene, 1-butene, 1-hexene, 1-pentene, 4-methyl-1-pentene, 1-octene, 1-decene, vinylcyclohexene, styrene, ethylidene norbornene, norbornadiene, 1,3-butadiene, 1,5-hexadiene, 1,7-octadiene, 1,9-decadiene, or a combination thereof.

* * * * *